United States Patent Office 2,781,332
Patented Feb. 12, 1957

2,781,332

MANUFACTURE OF ETHERIFIED MELAMINE-FORMALDEHYDE RESINS

Geoffrey Swann, Hunts Cross, Liverpool, and Peter G. A. Evans, Childwall, Liverpool, England, assignors to Reichhold Chemicals, Inc., Detroit, Mich.

No Drawing. Application October 15, 1953,
Serial No. 386,376

Claims priority, application Great Britain March 18, 1953

4 Claims. (Cl. 260—67.6)

This invention relates to improvements in or relating to the manufacture of etherified melamine-formaldehyde resins.

Many processes have been proposed for the manufacture of etherified melamine-formaldehyde resins, but they mostly contain certain features in common. Thus it is usual to condense melamine and aqueous formaldehyde in the liquid phase in the presence of an alkaline catalyst followed by concentration of the condensation product by distillation under reduced pressure. The resulting product, which consists largely of methylol melamines, is then etherified by heating with an alcohol such as n-butanol in the presence of an acid catalyst. If the system is arranged so that the water formed in the etherification reaction can be removed, for example by distilling off a water/butanol binary mixture through a decanting arrangement, the melamine-formaldehyde condensation product is etherified and gradually loses its solubility in water becoming increasingly more soluble in aromatic hydrocarbons. The final product is a solution of etherified melamine-formaldehyde resin dissolved in butanol or butanol plus aromatic hydrocarbon according to the requirements of the operator.

The above process can be varied in a great number of ways; for example the ratio of melamine/formaldehyde/butanol can be altered within wide limits while still furnishing technically desirable products. Similarly, the nature and quantity of both the alkaline and acid catalysts exert a great influence on the course of the reactions involved, whilst time and temperature also play important roles. Although it has been found possible to work a process such as the one described above by the use of stated quantities of basic and acidic catalysts it is more customary to operate during the basic and acidic stages of the reaction within certain ranges of pH. This eliminates to some extent differences arising from variations in the aqueous formaldehyde, melamine and butanol employed. The measurement and control of pH during the first, or alkaline condensation stage of the process is a simple matter since, being conducted in aqueous medium, the pH can be accurately determined by means of a glass electrode. During the second or etherification stage, however, the medium is virtually non-aqueous and the pH as measured by glass electrode or other means is consequently unreliable. Finally, melamine resins made by employing normal basic and acidic catalysts such as caustic soda and phosphoric acid contain in the finished resin solution a quantity of salt formed by the combination of these two components. Such salts, the presence of which is revealed by the ash content of the resin, act as electrolytes and exercise a deleterious effect on resins designed for electrical end uses.

The present invention provides a process for the manufacture of an etherified melamine-formaldehyde resin by condensing in a first stage melamine with an aqueous solution of formaldehyde, or a substance yielding formaldehyde, in the presence of an alkaline catalyst, and in a second stage condensing the product, preferably after removal of most of the water, with an aliphatic alcohol containing 3 to 5 carbon atoms in the molecule in the presence of an acid catalyst, wherein the alkaline catalyst employed in the first stage is calcium, barium or strontium hydroxide and the acid catalyst employed in the second stage is provided by passing a stream of carbon dioxide through the reaction mixture.

It will be appreciated that the process of the invention offers a two-fold advantage; the required acid pH is automatically maintained in the second stage by the passage of carbon dioxide through the reaction mixture without the need for other control, and the alkaline catalyst of the first stage is precipitated as carbonate and can thus readily be removed from the product.

Aliphatic alcohols containing from three to five carbon atoms which may be employed in the process of the invention include n-propyl alcohol, isobutyl alcohol, n-butyl alcohol and the amyl alcohols.

It is preferred to employ, per mole of melamine, 4.5 to 7 moles of the alcohol and either 6 to 7 moles or 3.5 to 6 moles of formaldehyde.

The following examples illustrate the manner in which the process can be performed.

Example 1

Into a vessel fitted with an agitator and reflux condenser are charged 18 moles of 36.5 aqueous formalin solution, after which the pH is adjusted to 7.7–8.0 with a saturated aqueous solution of barium hydroxide. Thereafter 3 moles of melamine are added and the charge is warmed with stirring at 80° C. and is held at this temperature until a sample of the product retains its clarity when cooled to 25° C. and also is miscible with cold water in all proportions. The pH, which has now fallen to some value below 7, is adjusted with further barium hydroxide solution to approximately 7.7 and the solution is subjected to distillation under reduced pressure until 65% of the water contained in the formalin solution employed plus the water contained in the catalyst solution has been collected in the form of distillate. The reaction vessel is now fitted with a lead-in tube extending to below the surface of the resin solution and the condenser is fitted with a decanter. n-Butanol (18 moles) is then added and the temperature is raised to 95° C. when the charge becomes homogeneous. A slow stream of carbon dioxide gas is introduced through the lead-in pipe and the temperature is raised to the boiling point of the mixture. The distillate separates into two layers in the decanter and the lower, water-rich phase is removed, but the upper, butanol-rich layer is returned continuously to the reaction vessel. The procedure is continued until water separation in the decanter becomes slight. Sampling of the resin is then commenced and the process is continued until a test sample becomes miscible with xylene in all proportions. The resin solution is then brought to any desired solids content by distillation under reduced pressure after which it is filtered.

A typical product made as described above was found to possess the following characteristics:

Non-volatile content __ 58.0%.
Viscosity (Gardner-Holdt scale) __ W.
Colour _____ Water-white.
Tolerances _____ 1 part of resin solution was miscible with 2.5 parts of mineral spirits and was also miscible in all proportions with both butanol and xylene.

Example 2

Example 1 was repeated, but using a saturated aqueous solution of strontium hydroxide as the alkaline catalyst in place of barium hydroxide. The product in this case had the following characteristics:

Non-volatile content _ 63%.
Viscosity (Gardner- V.
 Holdt).
Colour _____ Water-white.
Tolerances _____ 1 part of resin solution was miscible with 3 parts of mineral spirits. It was miscible in all proportions with xylene and with butanol.

*Example 3*

Example 1 was repeated, but using a saturated aqueous solution of calcium hydroxide in place of barium hydroxide. The product had the following characteristics:

Non-volatile content_____ 61.3%.
Viscosity_____ VV-N.
Colour_____ Slightly yellow.
Tolerances:
    Mineral spirits_____ 2.
    Xylene_____ Infinitely miscible.
    Butanol_____ Infinitely miscible.

*Example 4*

Into a vessel fitted with an agitator and reflux condenser are charged 5.25 moles of 36.5% aqueous formalin solution, after which the pH is adjusted to 7.7–8.0 with a saturated aqueous solution of barium hydroxide. Thereafter 1½ moles of melamine are added and the charge is warmed with stirring at 80° C. and is held at this temperature until a sample of the product has an acetone tolerance of 3.5–4, i. e., until a given volume of the resin solution shows a turbidity when mixed with 3.5–4 volumes of acetone. The pH, which has now fallen to some value below 7, is adjusted with further barium hydroxide solution to approximately 7.7 and the solution is subjected to distillation under reduced pressure until 65% of the water contained in the formalin solution employed has been collected in the form of distillate. The reaction vessel is now fitted with a lead-in tube extending to below the surface of the resin solution and the condenser is fitted with a decanter. n-Butanol (9 moles) is then added and the temperature is raised to 95° C. when the charge becomes homogeneous. A slow stream of carbon dioxide gas is introduced through the lead-in pipe and the temperature is raised to the boiling point of the mixture. The distillate separates into two layers in the decanter and the lower, water-rich phase is removed, but the upper, butanol-rich layer is returned continuously to the reaction vessel. This procedure is continued until water separation in the decanter becomes slight. Sampling of the resin is then commenced and the process is continued until the miscibility of the resin with xylene reaches a maximum value. The resin solution is then brought to any desired solids content by distillation under reduced pressure and/or by dilution with another solvent, after which it is filtered.

The product of this example had the folowing characteristics:

Non-volatile content_____ 56.5%.
Viscosity_____ V.
Colour_____ Water-white.
Tolerances:
    Mineral spirits_____ 1.9.
    Xylene_____ 15.
    Butanol_____ Infinitely miscible.

*Example 5*

Example 4 was repeated, but using the following quantities of the reactants:

| | Moles |
|---|---|
| Melamine | 3 |
| Aqueous formaldehyde 4×3 | 12 |
| Butanol 6×3 | 18 |

The characteristics of this product were as follows:

Non-volatile content_____ 51%.
Viscosity_____ U-VV.
Colour_____ Water-white.
Tolerances:
    Mineral spirits_____ 2.6.
    Xylene_____ 50.
    Butanol_____ Infinitely miscible.

*Example 6*

Example 1 was repeated, but employing reactants as follows:

| | Moles |
|---|---|
| Melamine | 1½ |
| Aqueous formaldehyde | 9 |
| Isobutanol | 9 |

The product in this case had the following characteristics:

Non-volatile content_____ 63.3%.
Viscosity_____ U-V.
Colour_____ Water-white.
Tolerances:
    Mineral spirits_____ 2.8.
    Xylene_____ Infinitely miscible.
    Butanol_____ Infinitely miscible.

*Example 7*

Example 1 was repeated, but employing reactants as follows:

| | Moles |
|---|---|
| Melamine | 1½ |
| Aqueous formaldehyde | 9 |
| Amyl alcohol | 9 |

The process of Example 1 was further modified in that distillation was continued with sampling of the resin until the miscibility of the resin with xylene reached a maximum value, and not complete miscibility as in Example 1. The resin solution was then brought to a desired solids content by distillation under reduced pressure and/or by dilution with another solvent, after which it was filtered.

The product has the following characteristics:

Non-volatile content_____ 63.3%.
Viscosity_____ U-V.
Colour_____ Water-white.
Tolerances:
    Mineral spirits_____ 1.
    Xylene_____ 18.
    Butanol_____ Infinitely miscible.

*Example 8*

9 moles of 36.5% aqueous formaldehyde solution are condensed in a reaction vessel with 1.5 moles of melamine in the presence of barium hydroxide, and the solution distilled to remove 65% of the water contained in the formaldehyde solution, exactly as described in the first part of Example 1. The reaction vessel is now fitted with a lead-in tube extending to below the surface of the resin solution and the condenser is fitted with a decanter. n-Propanol (9 moles) is then added followed by xylene (approximately 1.0 mole) and the temperature is raised to 95 C. A slow stream of carbon dioxide gas is introduced through the lead-in tube and the temperature is raised to the boiling point of the mixture. The distillate separates into two layers in the decanter and the lower, water-rich phase is removed, but the upper, propanol-rich layer is returned continuously to the reaction vessel. This procedure is continued until water separation in the decanter becomes slight. Sampling of the resin is then commenced and the process is continued until the miscibility of the resin with xylene reaches a maximum value. The resin solution is then brought to any desired solids content by distillation under reduced pressure and/or by dilution with another solvent, after which it is filtered.

The product had the following characteristics:

| | |
|---|---|
| Non-volatile content | 61.2%. |
| Viscosity | V–WW. |
| Colour | Slightly yellow. |
| Tolerances: | |
|     Mineral spirits | 0.4. |
|     Xylene | 6.5. |
|     Butanol | Infinitely miscible. |

What is claimed is:

1. A process for the manufacture of an etherified melamine-formaldehyde resin by condensing in a first stage melamine with an aqueous solution of a member of a group consisting of formaldehyde and substances yielding formaldehyde, in the presence of an alkaline catalyst, and in a second stage condensing the product with an unsubstituted, saturated monohydric aliphatic alcohol containing 3 to 5 carbon atoms in the molecule in the presence of an acid catalyst, wherein the alkaline catalyst employed in the first stage is a member of a group consisting of calcium, barium and strontium hydroxides and the acid catalyst employed in the second stage is provided by passing a stream of carbon dioxide through the reaction mixture, the reacting ingredients being employed in the ratio of 3.5 to 7 moles of aqueous formaldehyde and 4.5 to 7 moles of alcohol per mole of melamine.

2. A process as set forth in claim 1, wherein the condensation in the second stage takes place after removal of most of the water.

3. A process as claimed in claim 1, wherein 6 to 7 moles of aqueous formaldehyde and 4.5 to 7 moles of the alcohol are employed per mole of melamine.

4. A process as claimed in claim 1, wherein 3.5 to 6 moles of aqueous formaldehyde and 4.5 to 7 moles of the alcohol are employed per mole of melamine.

References Cited in the file of this patent

UNITED STATES PATENTS

| | | |
|---|---|---|
| 2,508,875 | Scott | May 23, 1950 |
| 2,642,418 | Wenning | June 16, 1953 |

OTHER REFERENCES

D'Alelio: Experimental Plastics and Synthetic Resins, pub. by John Wiley and Sons, London (1946); page 158.